United States Patent [19]

Astheimer

[11] Patent Number: 5,644,134
[45] Date of Patent: Jul. 1, 1997

[54] SUN SENSORS

[75] Inventor: Robert W. Astheimer, Fairfield, Conn.

[73] Assignee: EDO Corporation, Barnes Engineering Division, Shelton, Conn.

[21] Appl. No.: 505,791

[22] Filed: Jul. 21, 1995

[51] Int. Cl.⁶ .................................................. B64G 1/36
[52] U.S. Cl. ........................................ 250/372; 244/171
[58] Field of Search ................................ 250/372, 342, 250/206.1, 206.2, 216; 244/171

[56] References Cited

U.S. PATENT DOCUMENTS

| | | | |
|---|---|---|---|
| 3,609,364 | 9/1971 | Paine | 250/372 |
| 3,643,093 | 2/1972 | Diets | 250/372 |
| 3,665,440 | 5/1972 | McMenamin | 250/372 |
| 3,715,594 | 2/1973 | Drohan et al. | 250/372 |
| 3,728,715 | 4/1973 | Shapiro | 340/347 P |
| 4,455,487 | 6/1984 | Wendt | 250/372 |
| 4,810,870 | 3/1989 | Tsuno et al. | 250/203 R |
| 4,999,483 | 3/1991 | Okamoto | 250/203.1 |
| 5,041,727 | 8/1991 | Kojima et al. | 250/370.15 |
| 5,168,152 | 12/1992 | Kelley | 250/372 |

*Primary Examiner*—Davis L. Willis
*Assistant Examiner*—Kiet T. Nguyen
*Attorney, Agent, or Firm*—Parmelee, Bollinger & Bramblett

[57] ABSTRACT

A method is provided for greatly increasing the ratio of direct sunlight to earthshine in a sun sensor used on a spacecraft which is orbiting the earth and is used for the attitude determination of spacecraft with respect to the sun illuminated earth. The sun sensor is provided with a detector in which radiation applied thereto is restricted to a spectral region where the earth's atmosphere is extremely absorbent. Therefore, the detector only receives radiation in that spectral region directly from the sun, while any reflected light from the earth in the selected spectral region is absorbed by the earth's atmosphere, thereby never reaching the detector. One suitable spectral region is the ultraviolet absorption band from 200–290 nm and a UV enhanced silicon detector would be used in the sun sensor.

5 Claims, 1 Drawing Sheet

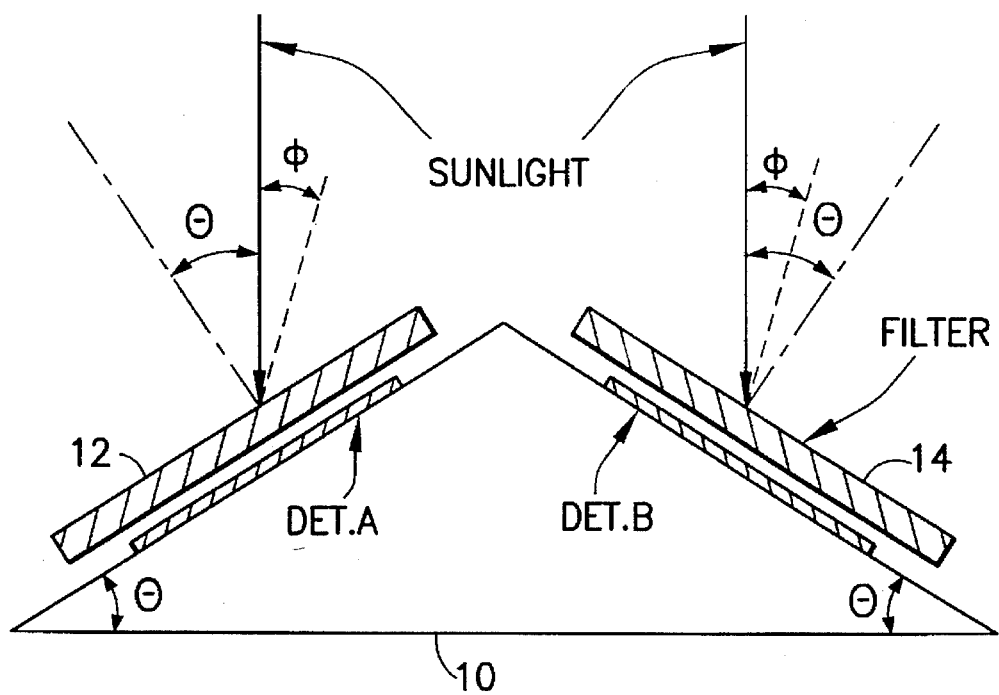

SUN SENSORS

FIELD OF THE INVENTION

This invention relates to sun sensors, and more particularly to a method for eliminating interference from the sun illuminated earth (earthshine) and the error in attitude determination carried by such interference.

BACKGROUND OF THE INVENTION

Sun sensors are commonly used on spacecraft for attitude determination. Since the position of the sun changes greatly with orbital location and season, sun sensors are usually required to operate over a wide angular range. As a result, sun sensors may occasionally view the sun illuminated earth (earthshine) as well as the sun, which can cause a significant error. This can be prevented to some degree by the use of baffles, but baffles restrict the field of view and may not be effective with large attitude offsets such as exists during acquisition.

SUMMARY OF THE INVENTION

Accordingly, it is an object of the present invention to provide a new and improved method of eliminating earthshine interference and the error caused by such interference in sun sensors.

In carrying out this invention in one illustrative embodiment thereof a method of greatly increasing the ratio of direct sunlight to earthshine in sun sensors comprises the steps of mounting a detector responsive to the sun on a spacecraft whose attitude is desired to be determined, and limiting radiation applied to the detector means to a spectral region in which the sun emits appreciable energy but where such energy striking the earth is absorbed in the earth's atmosphere before reaching the detector means, thereby limiting the effect of backscattered sun radiation from the earth and greatly increasing the ratio of direct sunlight to earthshine on the detector means.

BRIEF DESCRIPTION OF THE DRAWING

The invention together with further objects, aspects, features and advantages thereof will be more clearly understood from the following description taken in connection with the accompanying drawing.

The drawing shows a diagrammatic illustration of one form of structure for carrying out the method in accordance with the present invention.

DESCRIPTION OF THE PREFERRED EMBODIMENTS

In accordance with the present invention, a method of completely eliminating earthshine interference is to restrict the spectral band to a region where the earth's atmosphere is extremely absorbent. In such regions, there will be no reflected light and the earth will appear dark. One suitable spectral region is the UV ozone absorption band from 200–290 nm. The sun emits appreciable energy in this band but any energy in this band striking the earth is completely absorbed by the ozone in the upper atmosphere of the earth. A UV enhanced silicon detector would be used in the sun sensor.

Another possible suitable spectral region using this approach is the near infrared $H_2O/CO_2$ absorption band from 2.5 to 2.8 um. For this spectral region a lead sulfide detector would be used in the sun sensor.

Although the absorption of these bands is so strong that no solar energy reaches the surface of the earth, there always will be some light backscattered by non-absorbing components of the upper atmosphere such as $N_2$ and $O_2$ which may go back out without being absorbed. This effect is minimal in the UV region where the absorber (ozone) is concentrated in the upper atmosphere. In the case of IR absorbers, $CO_2$ and $H_2O$ are concentrated in the lower atmosphere, and there is a much greater region where radiation can be backscattered. However, this is offset by the fact that molecular backscattering is greatly reduced at the longer IR wavelengths. In any event, the objective is not to make the earthshine absolutely zero, but rather to greatly increase the ratio of direct sunlight to earthshine. Both of the aforesaid wavelength bands will effectively do this.

In any implementation of the method described above, a signal indicative of the angle to the sun must be provided. One means of implementing the invention is shown in the drawing. Two UV enhanced silicon detectors A and B of equal area are mounted on a roof base 10 having pitch angles θ. A filter 12 and 14 transmitting UV radiation between 200 and 290 nm is mounted directly over detectors A and B, respectively. When sunlight is normal to the base of the roof 10, the signal on each detector is $V_A = V_B = RBS \cos\theta$ where R=Responsivity of detector B=Area of detector S=Solar Irradiance If the direction to the sun changes by an angle $\phi$, the signals become $$V_A = RBS \cos(\theta+\phi) \ \& \ V_B = RBS \cos(\theta-\phi)$$

and the difference between them is:

$$V_A - V_B = RBS[\cos(\theta+\phi) - \cos(\theta-\phi)] = 2\, RBS \sin\theta \sin\phi$$

Thus $$\sin\theta = (V_A - V_B)/2\, RBS \sin\theta$$

The roof base arrangement is illustrated as a simple approach to the utilization of the method of the present invention, but other implementations may be made within the concept of the invention. For example, a double triangle implementation such as that described in an application entitled ANALOG SUN SENSOR, Ser. No. 08/350,683 filed Dec. 7, 1994 which is assigned to the assignee of the present invention may be used.

Accordingly, a very simple and effective method is provided for eliminating sun sensor error caused by the sun sensor viewing the sun illuminated earth (earthshine).

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. A method of greatly increasing the ratio of direct sunlight to earthshine in a sun sensor used on a spacecraft orbiting the earth and used for attitude determination of the spacecraft with respect to the sun illuminated earth comprising the steps of:

mounting detector means responsive to radiation from the sun on a spacecraft whose attitude is desired to be determined, limiting radiation applied to the detection means to a spectral region in which the sun emits appreciable energy but where such energy striking the earth is absorbed in the earth's atmosphere before reaching the detector means, thereby limiting the effect of backscattered sun radiation from the earth and greatly increasing the ratio of direct sunlight to earthshine on the detector means.

2. The method as claimed in claim 1 wherein said step of mounting detector means responsive to radiation from the sun includes the step of utilizing an ultraviolet (UV) enhanced silicon detector means.

3. The method as claimed in claim 2 wherein said step of limiting radiation applied to said detector means includes the step of limiting the radiation to the UV ozone absorption band from 200–290 nm.

4. The method as claimed in claim 1 wherein said step of limiting radiation applied to said detector means includes the step of limiting the radiation to the UV ozone absorption band from 200–290 nm.

5. The method as claimed in claim 1 wherein the step of limiting the radiation applied to said detection means includes the steps of limiting the spectral region in the near infrared $H_2O/CO_2$ absorption band from 2.5 to 2.8 um and utilizing a lead sulfide detector means.

* * * * *